United States Patent
Wu et al.

(10) Patent No.: US 7,796,489 B2
(45) Date of Patent: Sep. 14, 2010

(54) OPTICAL HEAD WITH DIFFUSER STRUCTURE

(75) Inventors: Chih Mang Wu, Miaoli County (TW); Kun-Wei Lin, Hsin Chu (TW)

(73) Assignee: Sunplus mMedia Inc., Hsinchu (TW)

( * ) Notice: Subject to any disclaimer, the term of this patent is extended or adjusted under 35 U.S.C. 154(b) by 212 days.

(21) Appl. No.: 12/207,867

(22) Filed: Sep. 10, 2008

(65) Prior Publication Data

US 2009/0073856 A1    Mar. 19, 2009

(30) Foreign Application Priority Data

Sep. 14, 2007 (TW) .............................. 96134368 A

(51) Int. Cl.
   *G11B 7/00* (2006.01)
(52) U.S. Cl. .................. 369/112.01; 235/454
(58) Field of Classification Search ............ 369/112.01, 369/112.23; 235/454, 437, 462.43; 250/556, 250/557

See application file for complete search history.

(56) References Cited

U.S. PATENT DOCUMENTS

| 4,182,956 | A | * | 1/1980 | Funk et al. | 250/239 |
| 5,449,892 | A | * | 9/1995 | Yamada | 235/462.42 |
| 7,516,899 | B2 | * | 4/2009 | Laser | 235/454 |
| 2008/0142604 | A1 | * | 6/2008 | Nunnink | 235/454 |

* cited by examiner

*Primary Examiner*—Thang V Tran
(74) *Attorney, Agent, or Firm*—Muncy, Geissler, Olds & Lowe, PLLC

(57) ABSTRACT

An optical head for reading an object includes a hollow housing, a light source module, a diffuser structure and a light sensing module. The light source module is fixed in the hollow housing and provides an initial light ray. The diffuser structure is connected the hollow housing, receives the initial light ray, and processes the initial light ray into a uniform light ray for output. The initial light ray is reflected by the diffuser structure multiple times to form the uniform light ray. The light sensing module is fixed in the hollow housing and senses the uniform light ray reflected by the object. An optical axis of the light sensing module is substantially parallel to an axial direction of the diffuser structure.

20 Claims, 5 Drawing Sheets

OPTICAL HEAD WITH DIFFUSER STRUCTURE

This application claims priority of No. 096134368 filed in Taiwan R.O.C. on Sep. 14, 2007 under 35 USC 119, the entire content of which is hereby incorporated by reference.

BACKGROUND OF THE INVENTION

1. Field of Invention

The invention relates to an optical head having a diffuser structure, and more particularly to an optical head having a tube-like or rod-like diffuser structure for improving the success rate of reading two-dimensional bar codes and eliminating the problem of dead spots of recognition caused by reflected stray light.

2. Related Art

FIG. 1 is a schematic illustration showing application of a conventional optical head 101. Referring to FIG. 1, the optical head 101 for reading an object 102 includes a hollow housing 110, a light source module 120 and a light sensing module 140. The light source module 120 is fixed in the hollow housing 110 and provides a light ray. The light ray is reflected in the hollow housing 110 and then illuminates the object 102. The light sensing module 140 fixed in the hollow housing 110 senses the light ray reflected by the object 102.

The light ray reflection may include specular reflection, spread reflection and diffuse reflection. The specular reflection represents that the incident angle of the light ray is the same as the angle of reflection of the light ray. The spread reflection occurs on an uneven surface. When the number of angles of reflected light rays exceeds the value, the angles of reflection of some reflected light rays are the same as the incident angle. The diffuse reflection occurs on a rough or uneven surface, and the reflected light rays have different angles.

Because the inner wall surface of the hollow housing 110 does not pertain to a specular surface, stray light L10 may enter the light sensing module 140. The currently used light sensing module 140 includes a CMOS (Complementary Metal Oxide Semiconductor) sensor having the resolution of about 100*100 DPI. The field of view (FOV) of the lens in the CMOS sensor of the light sensing module 140 is about ArcTan(pattern diagonal/2/EFL)*2. The light source module 120 is usually a light-emitting diode (LED) for emitting infrared light with the wavelength of about 800 to 950 nm. A lens fixing structure of the light sensing module 140 may adjust the image acquiring distance from the lens to the object 102. The illumination effect of the optical head 101 on the object 102 is controlled by adjusting the lens fixing structure of the light sensing module 140, designing the reflection property of the inner wall surface of the hollow housing 110 and adjusting the position of the light source module 120.

For example, the resolution of the lens is about 50 to 80 lp/mm, wherein RI>80%, and the f-number (F/N) cannot be too high to increase the illumination loading. The allowable tilt angle of the optical head for reading the object has to reach 30 to 40 degrees, and the depth of field of the lens is greater than ±0.7 mm. The object 102 may be an e-book on which two-dimensional bar code patterns are printed. Because the surface material of the sheet of the e-book can easily reflect light and the tilt angle A between the optical head and the surface of the sheet may reach 0 to 30 degrees or even 0 to 40 degrees when the user holds the optical head to read the e-book. Thus, it is necessary to prevent the strong light reflected by the surface of the sheet from entering the light sensing module 140 so that the object cannot be recognized.

In FIG. 1, the light ray outputted from the light source module 120 of the LED, for example, impinges on the inner wall surface of the hollow housing 110 of the conical pen head to increase the intensity of the incident light. However, there is the reflected light still can enter the light sensing module 140 when the incident angle is equal to 24 degrees. In addition, the inner wall surface (typically referred to as a reflective shell) having the reflecting effect also makes the stray light travel back to the light sensing module 140 so that the contrast is further decreased.

FIG. 2 is a schematic illustration showing application of another conventional optical head. As shown in FIG. 2, the optical head is similar to that of FIG. 1 except that the light ray of a LED 120 directly illuminates the object 102. Such a condition tends to make the reflected light enter the light sensing module 140 so that the contrast is further decreased.

Consequently, the drawback of the conventional optical head is that the dead spots of recognition caused by the reflected strong light cannot be eliminated so that the illumination efficiency cannot be effectively increased, the usage and power consumption of the LED cannot be decreased, and the allowable range of the tilt angle cannot be effectively broadened.

SUMMARY OF THE INVENTION

It is therefore an object of the invention to provide an optical head with a diffuser structure, wherein the optical head can provide a uniform output light ray to eliminate the dead spots of recognition caused by strong light, to enhance the illumination efficiency, to broaden the allowable range of the tilt angle, and thus to enhance the convenience in use.

The invention achieves the above-identified object by providing an optical head for reading an object. The optical head includes a hollow housing, a light source module, a diffuser structure and a light sensing module. The light sensing module includes a lens fixing structure, a lens and an image sensor. The light source module is fixed in the hollow housing and provides an initial light ray. The diffuser structure is connected to the hollow housing, receives the initial light ray and processes the initial light ray into a uniform light ray for output. The initial light ray is reflected by the diffuser structure many times to form the uniform light ray. The light sensing module is fixed in the hollow housing and senses the uniform light ray reflected by the object. An optical axis of the light sensing module is substantially parallel to an axial direction of the diffuser structure. The lens is fixed in the lens fixing structure. The image sensor is fixed in the lens fixing structure and receives the uniform light ray reflected by the object through the lens.

As mentioned hereinabove, the optical head having the diffuser structure according to the invention can provide a uniform output light ray to eliminate dead spots of recognition caused by strong light, to enhance the illumination efficiency, to broaden the allowable range of the tilt angle, and thus to enhance the convenience in use.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

First Embodiment

Figure 1:
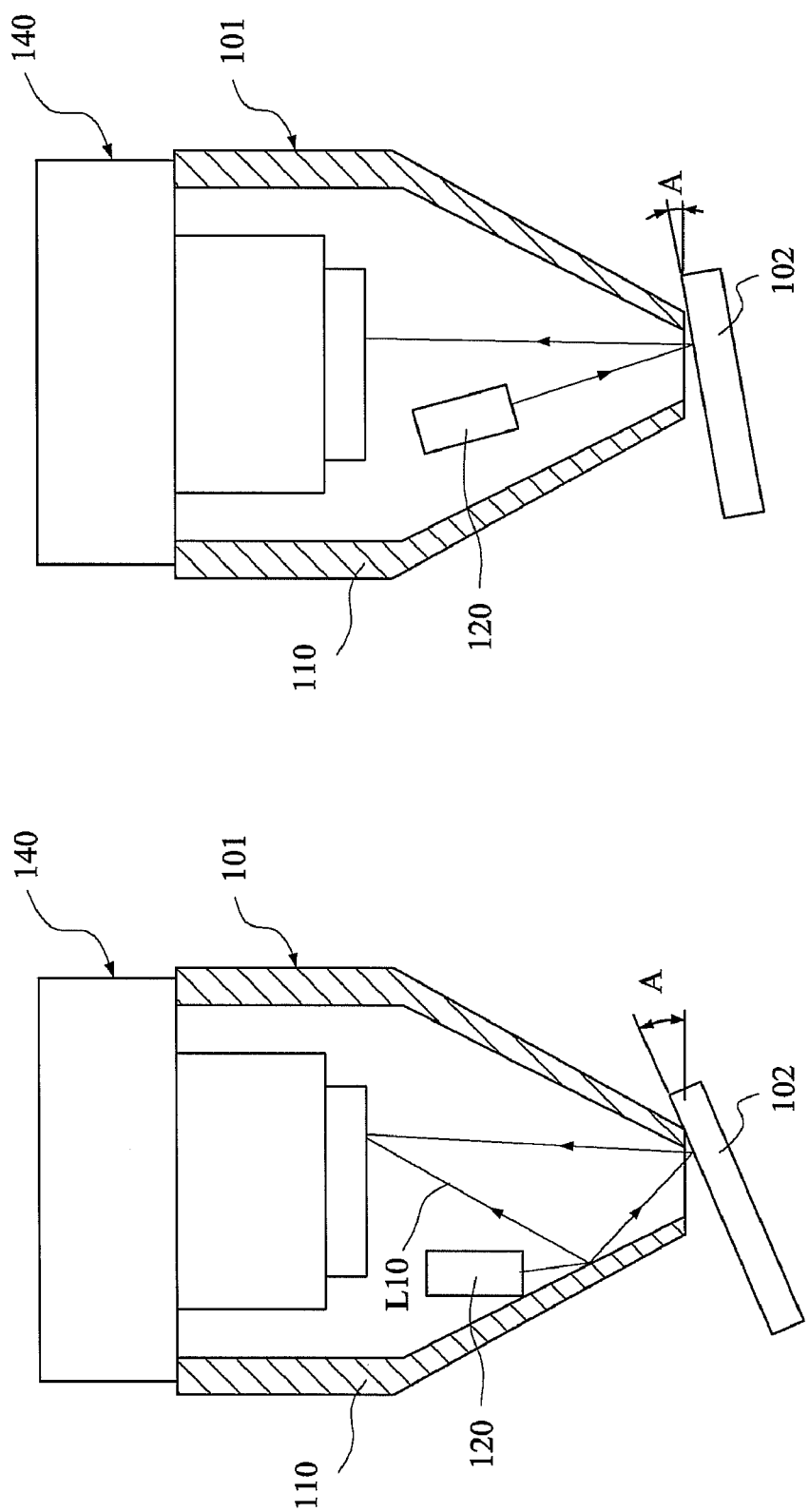
FIG. 1 is a schematic illustration showing application of a conventional optical head.
Figure 2:
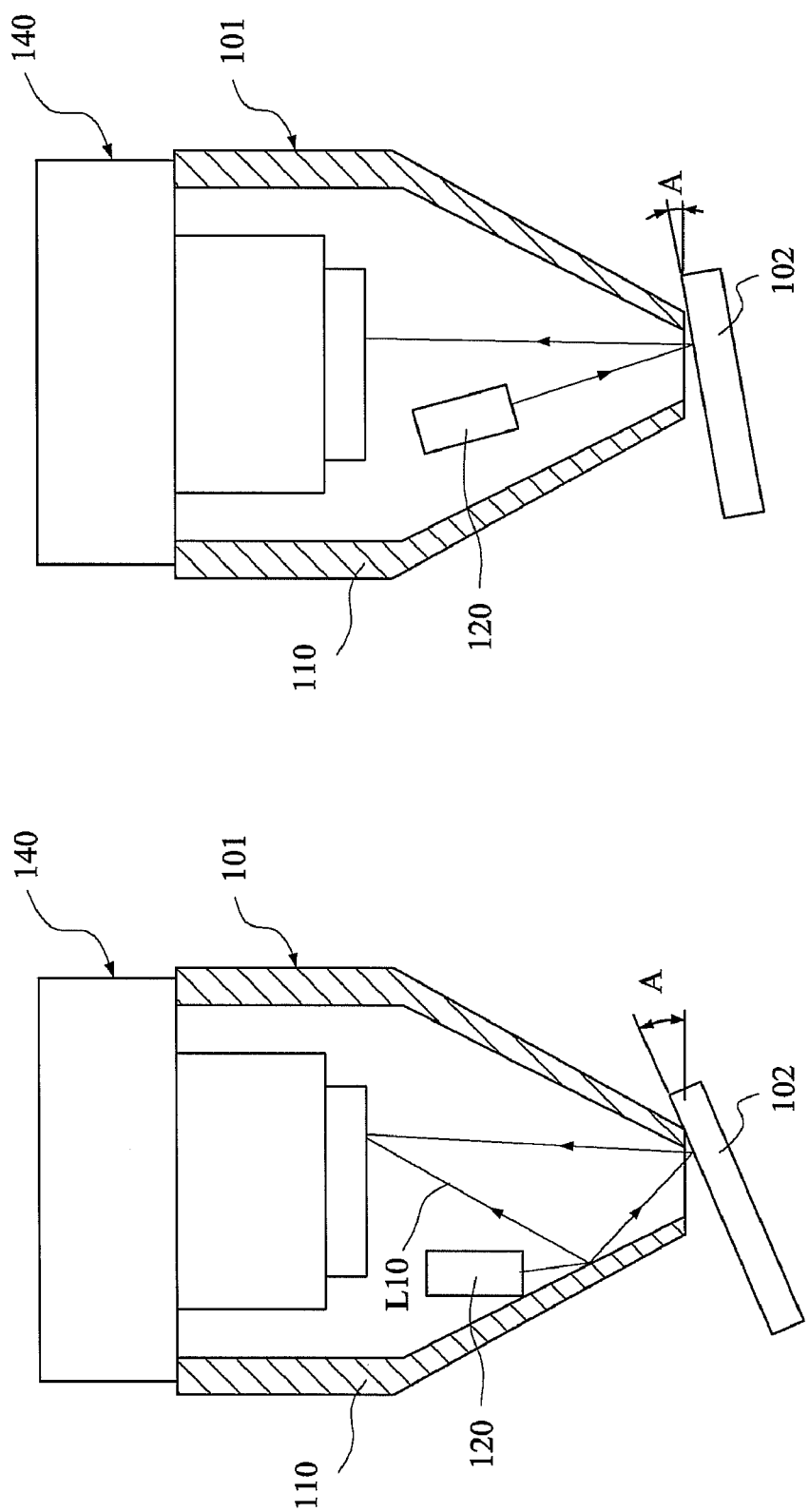
FIG. 2 is a schematic illustration showing application of another conventional optical head.
Figure 3:
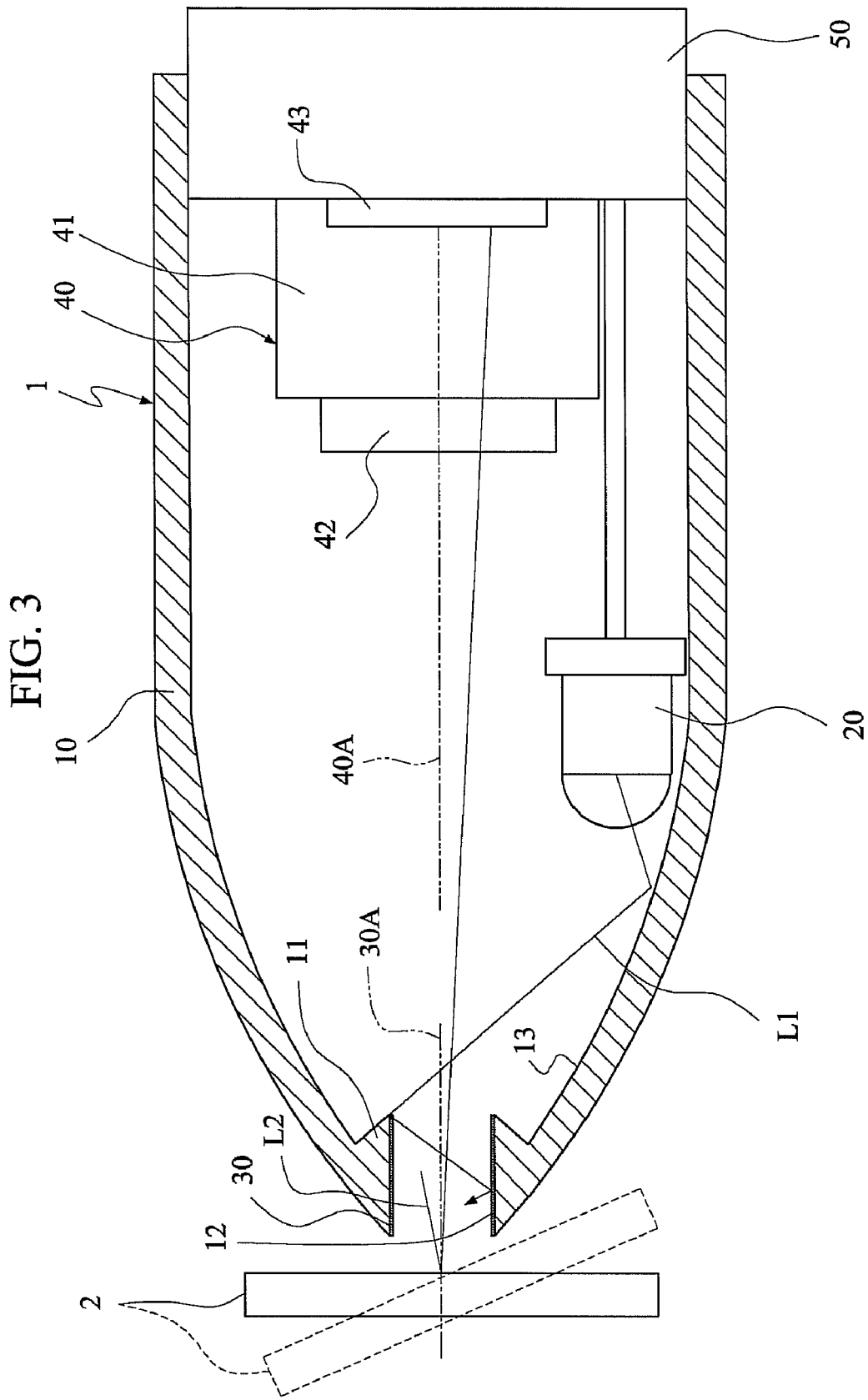
FIG. 3 is a schematic illustration showing application of an optical head according to a first embodiment of the invention.

FIG. 3 is a schematic illustration showing application of an optical head 1 according to a first embodiment of the invention. Referring to FIG. 3, the optical head 1 for reading an object 2, such as an e-book, on which two-dimensional bar code patterns are printed, includes a hollow housing 10, a light source module 20, a diffuser structure 30 and a light sensing module 40.

The light source module 20 is fixed in the hollow housing 10 and provides an initial light ray L1. The light source module 20 includes, without limitation to, a light-emitting diode (LED) or multiple LEDs. The LEDs may output the same light ray or different light rays. In this embodiment, an LED is provided as an example, and the initial light ray L1 is reflected from an inner wall surface 13 of the hollow housing 10 to the diffuser structure 30. However, the initial light ray L1 may also be directly incident to the diffuser structure 30.

The diffuser structure 30 connected to the hollow housing 10 receives the initial light ray L1 and processes the initial light ray L1 into a uniform light ray L2 for output. The initial light ray L1 is reflected in the diffuser structure 30 many times to form the uniform light ray L2. In this embodiment, the diffuser structure 30 is formed on an inner circumferential wall 12 of an opening 11 of the hollow housing 10. Therefore, the diffuser structure 30 is a tube-like structure, and a diffuse-reflection material is applied to an inner tube wall of the diffuser structure 30. The diffuser structure 30 also has a closed cross-sectional area, which may have a circular shape, an elliptic shape or a polygonal shape. Therefore, the shape of the cross-sectional area of the inner circumferential wall 12 of the opening 11 is circular, elliptic or polygonal. It is to be noted that the hollow housing 10 may also be divided into several portions. For example, the conical portion of the hollow housing 10 in the drawing may be combined with the cylindrical portion of the hollow housing 10 by way of screwing.

The light sensing module 40 fixed in the hollow housing 10 senses the uniform light ray L2 reflected by the object 2. An optical axis 40A of the light sensing module 40 is substantially parallel to an axial direction 30A of the diffuser structure 30. In this embodiment, the light sensing module 40 includes a lens fixing structure 41, a lens 42 and an image sensor 43. Both the lens 42 and the image sensor 43 are fixed in the lens fixing structure 41. The image sensor 43 receives the uniform light ray L2 reflected by the object 2 through the lens 42.

In addition, the optical head 1 may further include a circuit board 50, on which a plurality of electrical elements constituting a processing circuit is formed. After the optical head 1 has read the pattern on the object, the processing circuit on the circuit board 50 may directly recognize the pattern and output a signal, such as an output voice or an output light ray, corresponding to the pattern in order to interact with the user. It is to be noted that the circuit board 50 and the processing circuit thereon may be regarded as one portion of the light sensing module 40.

Thus, in this embodiment, the inner wall surface 13 of the hollow housing 10, which is usually referred to as a reflector, is configured to have a curved reflective surface for converging the initial light ray into a light pipe so that the illumination may be homogenized. Therefore, as long as the shape in the reflector is properly designed, the good illumination efficiency may be achieved.

Second Embodiment

In this embodiment, a tube-like diffuser structure is used to provide the homogenized light ray.

Figure 4:
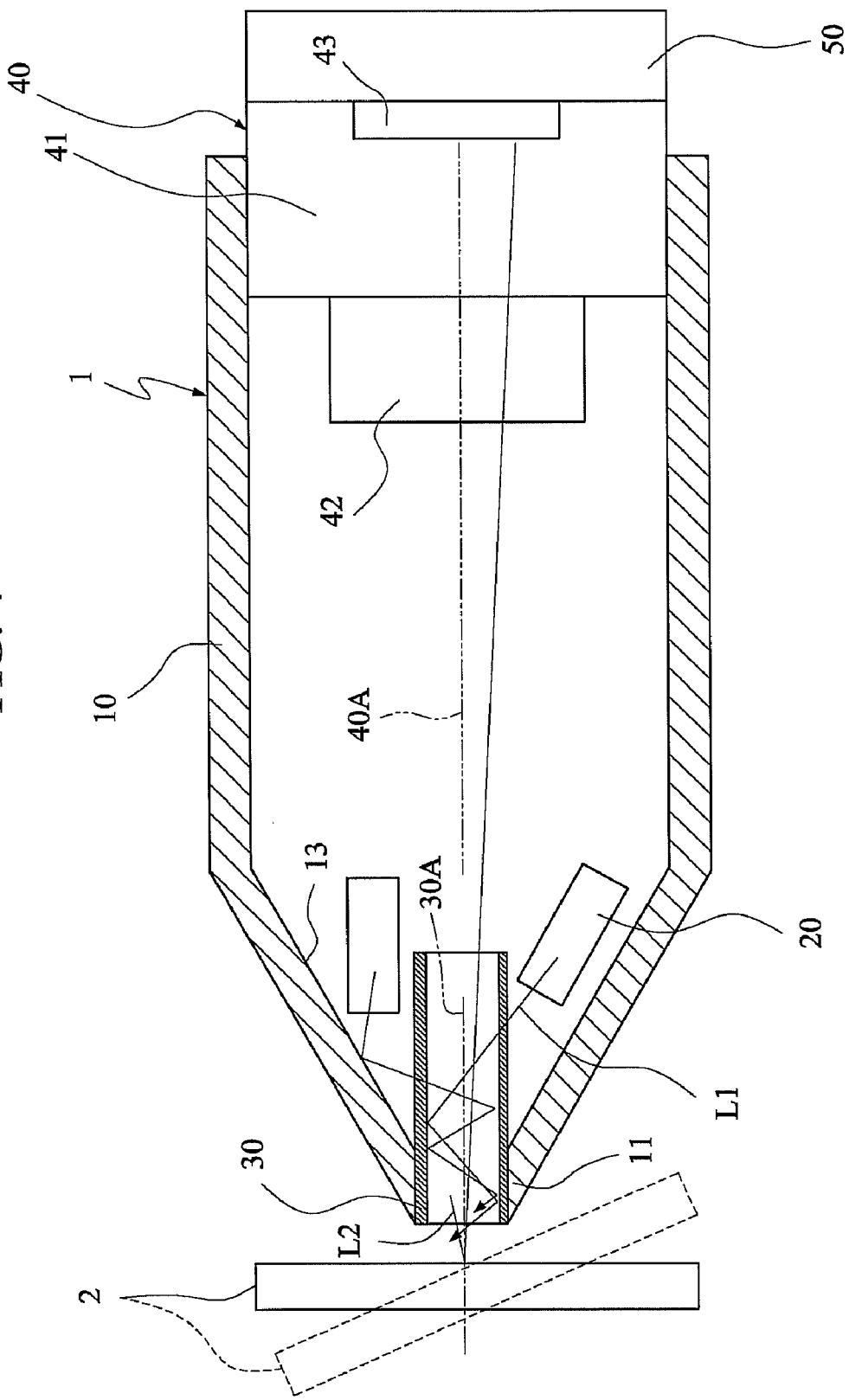
FIG. 4 is a schematic illustration showing application of an optical head according to a second embodiment of the invention.

FIG. 4 is a schematic illustration showing application of an optical head according to a second embodiment of the invention. As shown in FIG. 4, the optical head of this embodiment is similar to the first embodiment except that the diffuser structure 30 is a hollow tube mounted on the opening 11 of the hollow housing 10. Thus, the initial light ray L1 is refracted through the diffuser structure 30 and then reflected in the diffuser structure 30. It is to be noted that the diffuser structure 30 may be a solid cylinder, which is advantageous to the isolation of the external dust from the light sensing module 40. Alternatively, the diffuser structure 30 may be composed of the hollow tube and a transparent member for sealing the hollow tube.

In addition, it is also possible to design the diffuser structure 30 to be slidable relative to the hollow housing 10 in this embodiment. Thus, the reflection condition of the initial light ray and the property of the uniform light ray may be adjusted. Consequently, the required assembling precision of the LED of the light source module 20 may be decreased.

Third Embodiment

In this embodiment, a tube-like diffuser structure is used in conjunction with a light integrating structure to provide the homogenized light ray.

Figure 5:
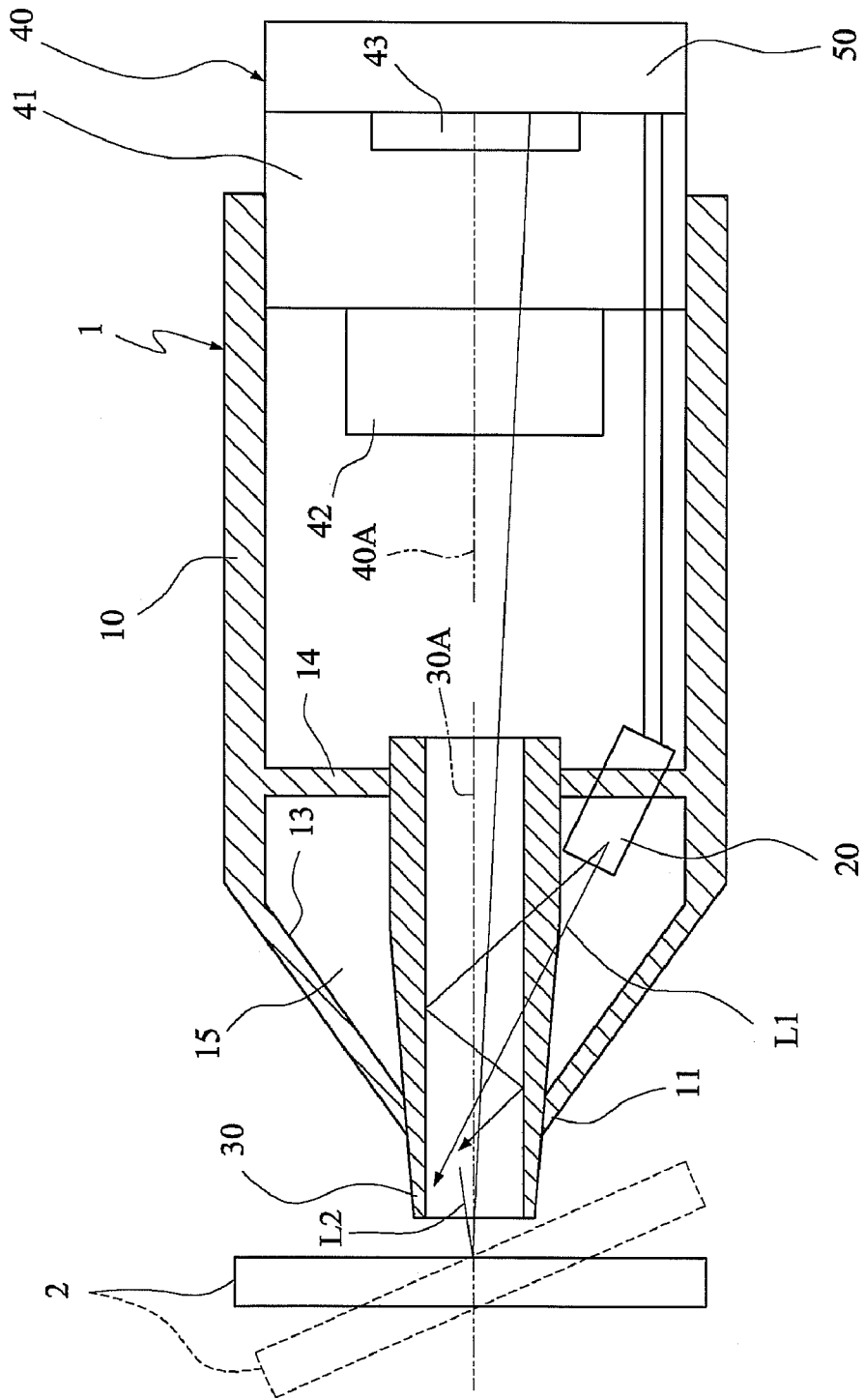
FIG. 5 is a schematic illustration showing application of an optical head according to a third embodiment of the invention.

FIG. 5 is a schematic illustration showing application of an optical head according to a third embodiment of the invention. As shown in FIG. 5, the optical head of this embodiment is similar to the first embodiment except that the diffuser structure 30 is mounted on the opening 11 of the hollow housing 10 and an inner stopper edge 14 of the hollow housing 10. Therefore, the diffuser structure 30, the hollow housing 10 and the inner stopper edge 14 may form an airtight space 15 serving as a light integrating structure so that the much more homogenized light ray can be provided in conjunction with the diffuser structure 30.

In this embodiment, the LED of the light source module 20 is disposed in the airtight space 15, and the initial light ray L1 is first refracted through the diffuser structure 30 and then reflected in the diffuser structure 30, which is a hollow tube. However, the diffuser structure 30 may be a solid cylinder, which is advantageous to the isolation of the external dust from the light sensing module 40. Alternatively, the diffuser structure 30 may be composed of the hollow tube and a transparent member for sealing the hollow tube.

In addition, it is also possible to design the diffuser structure 30 to be slidable relative to the hollow housing 10 in this embodiment. Thus, the reflection condition of the initial light ray and the property of the uniform light ray may be adjusted. Consequently, the required assembling precision of the LED of the light source module 20 may be effectively decreased.

Fourth Embodiment

Figure 6:
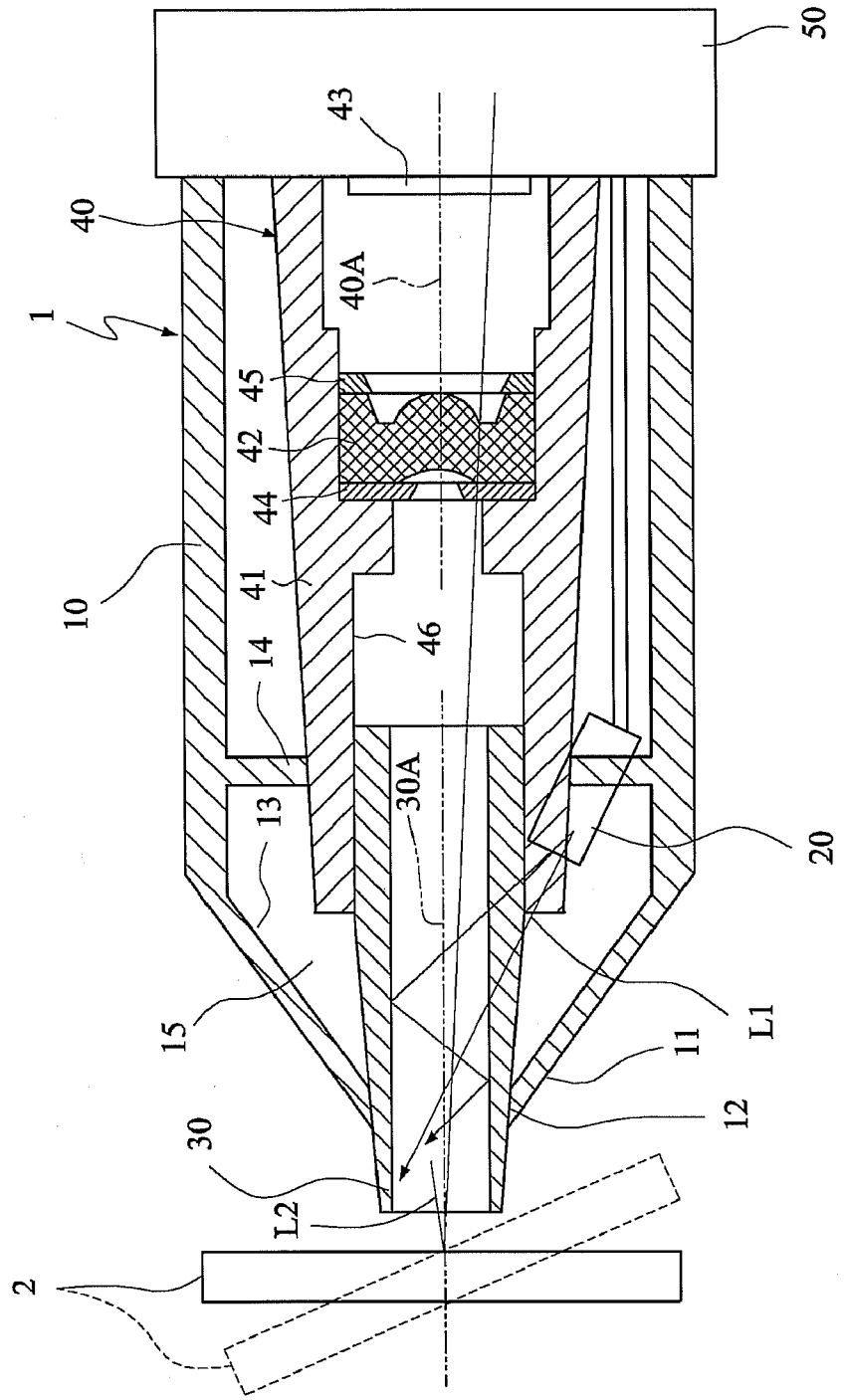
FIG. 6 is a schematic illustration showing application of an optical head according to a fourth embodiment of the invention.

FIG. 6 is a schematic illustration showing application of an optical head according to a fourth embodiment of the invention. As shown in FIG. 6, the optical head of this embodiment is similar to the third embodiment except that the light sensing module 40 further includes a first spacer 44 and a second spacer 45. The first spacer 44 is disposed between the lens 42 and the diffuser structure 30, and tightly rests against the lens 42 and the lens fixing structure 41 so that a relative distance between the lens 42 and the image sensor 43 may be adjusted. The second spacer 45 is disposed between the lens 42 and the image sensor 43 to fix the lens 42 and eliminate the stray light.

The diffuser structure 30 is mounted on the opening 11 of the hollow housing 10 and a guiding slot 46 of the lens fixing structure 41. The lens fixing structure 41 is mounted on the inner stopper edge 14 of the hollow housing 10 so that the diffuser structure 30, the hollow housing 10, the lens fixing structure 41 and the inner stopper edge 14 form the airtight space 15 serving as the light integrating structure. The diffuser structure 30 may slide in the guiding slot 46 and thus relative to the hollow housing 10.

In summary, the optical head having the diffuser structure of the invention can provide the uniform output light ray to eliminate dead spots of recognition caused by the reflected light, to enhance the illumination efficiency, to broaden the allowable range of the tilt angle, and thus to enhance the convenience in use.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An optical head for reading an object, the optical head comprising:
    a hollow housing;
    a light source module, which is fixed in the hollow housing and provides an initial light ray;
    a diffuser structure, which is connected to the hollow housing, receives the initial light ray and processes the initial light ray into a uniform light ray for output, wherein the initial light ray is reflected by the diffuser structure many times to form the uniform light ray; and
    a light sensing module, fixed in the hollow housing, for sensing the uniform light ray, wherein an optical axis of the light sensing module is substantially parallel to an axial direction of the diffuser structure, and the light sensing module comprises:
        a lens fixing structure;
        a lens, fixed in the lens fixing structure; and
        an image sensor, which is fixed in the lens fixing structure and receives the uniform light ray through the lens.

2. The optical head according to claim 1, wherein the diffuser structure is formed on an inner circumferential wall of an opening of the hollow housing.

3. The optical head according to claim 2, wherein a cross-sectional area of the inner circumferential wall of the opening is a circular shape, an elliptic shape or a polygonal shape.

4. The optical head according to claim 2, wherein the initial light ray is reflected from an inner wall surface of the hollow housing to the diffuser structure.

5. The optical head according to claim 1, wherein the diffuser structure is mounted on an opening of the hollow housing.

6. The optical head according to claim 5, wherein the initial light ray is first refracted through the diffuser structure and then reflected in the diffuser structure.

7. The optical head according to claim 5, wherein the diffuser structure is a hollow tube or a solid cylinder.

8. The optical head according to claim 5, wherein the diffuser structure may slide relative to the hollow housing.

9. The optical head according to claim 1, wherein the diffuser structure is mounted on an opening of the hollow housing and an inner stopper edge of the hollow housing so that the diffuser structure, the hollow housing and the inner stopper edge form an airtight space serving as a light integrating structure.

10. The optical head according to claim 9, wherein the initial light ray first penetrates through the diffuser structure and is then reflected in the diffuser structure.

11. The optical head according to claim 9, wherein the diffuser structure is a hollow tube or a solid cylinder.

12. The optical head according to claim 9, wherein the diffuser structure may slide relative to the hollow housing.

13. The optical head according to claim 9, wherein the light source module is disposed in the airtight space.

14. The optical head according to claim 1, wherein the light sensing module further comprises:
    a first spacer, which is disposed between the lens and the diffuser structure and tightly rests against the lens and the lens fixing structure; and
    a second spacer, disposed between the lens and the image sensor, in order to fix the lens and eliminate stray light.

15. The optical head according to claim 1, wherein the diffuser structure is mounted on an opening of the hollow housing and a guiding slot of the lens fixing structure, the lens fixing structure is mounted on an inner stopper edge of the hollow housing so that the diffuser structure, the hollow housing, the lens fixing structure and the inner stopper edge form an airtight space serving as a light integrating structure.

16. The optical head according to claim 15, wherein the initial light ray is first refracted through the diffuser structure and then reflected in the diffuser structure.

17. The optical head according to claim 15, wherein the diffuser structure is a hollow tube.

18. The optical head according to claim 15, wherein the diffuser structure is a solid cylinder.

19. The optical head according to claim 15, wherein the diffuser structure may slide in the guiding slot and thus relative to the hollow housing.

20. The optical head according to claim 15, wherein the light source module is disposed in the airtight space.

* * * * *